United States Patent
Chen

(10) Patent No.: US 8,417,521 B2
(45) Date of Patent: Apr. 9, 2013

(54) METHOD, DEVICE AND SYSTEM FOR IMPLEMENTING SPEECH RECOGNITION FUNCTION

(75) Inventor: Cheng Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1047 days.

(21) Appl. No.: 12/105,620

(22) Filed: Apr. 18, 2008

(65) Prior Publication Data

US 2008/0228483 A1 Sep. 18, 2008

Related U.S. Application Data

(63) Continuation of application No. PCT/CN2006/002807, filed on Oct. 20, 2006.

(30) Foreign Application Priority Data

Oct. 21, 2005 (CN) .......................... 2005 1 0114276

(51) Int. Cl.
*G10L 15/00* (2006.01)
(52) U.S. Cl. ........ 704/231; 704/235; 704/251; 704/270; 704/270.1
(58) Field of Classification Search .................. 704/231, 704/235, 251, 270, 270.1
See application file for complete search history.

(56) References Cited

U.S. PATENT DOCUMENTS

| | | | |
|---|---|---|---|
| 6,532,446 B1 | 3/2003 | King | |
| 6,542,867 B1 | 4/2003 | Sun et al. | |
| 7,068,598 B1 | 6/2006 | Bryson et al. | |
| 2002/0143874 A1 | 10/2002 | Marquette et al. | |
| 2002/0184346 A1 | 12/2002 | Mani | |
| 2003/0009337 A1* | 1/2003 | Rupsis | 704/260 |
| 2004/0010582 A1 | 1/2004 | Oliver | |
| 2005/0060149 A1* | 3/2005 | Guduru | 704/233 |
| 2005/0114118 A1* | 5/2005 | Peck | 704/208 |
| 2005/0163288 A1 | 7/2005 | Lobig | |
| 2005/0232166 A1* | 10/2005 | Nierhaus | 370/260 |

FOREIGN PATENT DOCUMENTS

| | | |
|---|---|---|
| CN | 1298249 A | 6/2001 |
| CN | 1315722 A | 10/2001 |
| CN | 1390013 | 1/2003 |
| CN | 1547190 | 11/2004 |
| EP | 1235406 A1 | 8/2002 |

OTHER PUBLICATIONS

International Search Report for International Application No. PCT/CN2006/002807, dated Jan. 16, 2007, with English translation.
Extended European Search Report regarding Application No. EP06805016 dated Dec. 16, 2008.

(Continued)

*Primary Examiner* — Qi Han
(74) *Attorney, Agent, or Firm* — Huawei Technologies Co., Ltd.

(57) ABSTRACT

The present disclosure discloses a method, a device and a system for implementing a speech recognition function, in which a media resource control device controls a media resource processing device to recognize a speech input by a user via H.248 protocol. The method includes receiving, by the media resource processing device, an H.248 message carrying a speech recognition instruction and a related parameter sent by the media resource control device; performing speech recognition according to the speech recognition instruction and the parameter; and reporting a recognition result to the media resource control device. A corresponding device and system for implementing the speech recognition function is further provided.

7 Claims, 2 Drawing Sheets

OTHER PUBLICATIONS

Written Opinion of the International Searching Authority regarding Application No. PCT/CN2006/002807, mailed Feb. 1, 2007. Translation provided by Huawei Technologies Co., Ltd.

First Office Action regarding Chinese Application No. 200510114276.3, mailed Jan. 18, 2008. Partial translation provided by Huawei Technologies Co., Ltd.

First Office Action regarding Chinese Application No. 200710153069.8, mailed Mar. 1, 2010. Partial translation provided by Huawei Technologies Co., Ltd.

3GPP TS 23.218 V6.3.0 (Mar. 2005). Technical Specification. 3rd Generation Partnership Project; Technical Specification Group Core Network; IP Multimedia (IM) session handling; IM call model; Stage 2 (Release 6). Global System for Mobile Communications.

3GPP TS 23.228 V7.1.0 (Sep. 2005). Technical Specification. 3rd Generation Partnership Project; Technical Specification Group Services and System Aspects; IP Multimedia Subsystem (IMS); Stage 2 (Release 7).

International Telecommunication Union. ITU-T Telecommunication Standardization Sector of ITU. H.248 (Jun. 2000). Series H: Audiovisual and Multimedia Systems. Infrastructure of audiovisual services- Communication procedures. Gateway control protocol.

McGlashan et al. Voice Extensible Markup Language (VoiceXML) 3.0. W3C Working Draft. Dec. 16, 2010.

International Telecommunication Union. ITU-T Telecommunication Standardization Sector of ITU. H.248.9 (Jan. 2005). Series H: Audiovisual and Multimedia Systems. Infrastructure of audiovisual services—Communication procedures. Gateway control protocol: Advanced media server packages.

D. Burnett and S. Shanmugham. "Media Resource Control Protocol Version 2 (MRCPv2)." Nov. 15, 2011. SPEECHSC Internet-Draft.

Request for Invalidation of Patent Right regarding ZL 200510114276.3, dated Jan. 13, 2012. Partial translation provided by Huawei Technologies Co., Inc.

\* cited by examiner

METHOD, DEVICE AND SYSTEM FOR IMPLEMENTING SPEECH RECOGNITION FUNCTION

CROSS-REFERENCE TO RELATED APPLICATIONS

This application is a continuation of International Application No. PCT/CN2006/002807, filed Oct. 20, 2006. This application claims the benefit of Chinese Patent Application No. 200510114276.3, filed Oct. 21, 2005. The disclosures of the above applications are incorporated herein by reference.

FIELD

The present disclosure relates to the field of information technology, and in particular, to a method, device and system for implementing a speech recognition function.

BACKGROUND

The statements in this section merely provide background information related to the present disclosure and may not constitute prior art.

The speech recognition refers to the function of converting a speech input by a user into a text according to a specific grammar. For example, in an interaction application, a system first plays a prompt tone "What do you want? Water, soda, or fruit juice?" to a user. The user may reply via a speech, and the speech can only include the pronunciation of key words "water", "soda", "fruit juice" or "nothing". The system may recognize the speech of the user and then provide the selected thing to the user.

In the fixed or mobile network application, there are usually two methods for a user to input.

Method 1: The user inputs a Dual Tone Multi-Frequency (DTMF). For example, in the above interaction application, when the user inputs "1", it is indicated that "water" is selected; when the user inputs "2", it is indicated that "soda" is selected; when the user inputs "3", it is indicated that "fruit juice" is selected; and when any other key is pressed, it is indicated that "nothing" is wanted. Such a method has been defined in H.248 protocol.

Method 2: The user directly inputs a speech, and the system may deliver the speech input by the user to the other communicating party, or record the speech, or perform speech recognition.

A function similar to DTMF input may be accomplished via the speech recognition process. The system may determine the user selection according to the speech of the user. The advantages of the speech recognition lie in that, the user may interact with a system directly via a speech and no other auxiliary input device, such as device for inputting DTMF by pressing a key, is needed, so that the user input mode may be simplified. As the speech recognition technology improves, the speech recognition technology will become the predominant input mode.

H.248 protocol defines abundant media resource control methods via packages.

H.248.9 protocol defines the methods via Advanced Media Server Packages, including the following.

The method of playing a speech segment, in which the location of the speech segment may be indicated by a Uniform Resource Identifier (URI), and parameters such as number of iterations of the playing of the speech segment, The interval of silence to be inserted between iterative plays, and volume and speed of each playing, may be indicated;

The method of playing tone and DTMF collection, in which the prompt tone playing and the DTMF collection are performed interactively; and The method of audio recording, in which the ID or the storage location of a record file is returned.

H.248.7 protocol defines a method for playing a record according to an announcement ID.

H.248.16 protocol defines a method for a complex DTMF digit collection operation.

However, the method for a user to directly input a speech is not defined in H.248 protocol, and the speech recognition function is needed in the media resource application environment.

SUMMARY

The various embodiments of the disclosure provide a method, a device and a system for implementing a speech recognition function so that the speech recognition may be performed according to an instruction and a parameter carried in a related message, and a user may directly interact with a system via a speech. Various embodiments of the disclosure provide a method for implementing a speech recognition function, in which a media resource control device controls a media resource processing device to recognize a speech input by a user via H.248 protocol. The method includes:

receiving, by the media resource processing device, an H.248 message carrying a speech recognition instruction and a related parameter sent by the media resource control device;

performing, by the media resource processing device, a speech recognition according to the speech recognition instruction and the parameter; and reporting a recognition result to the media resource control device.

The related parameter includes a recognition grammar parameter for a speech.

When the recognition grammar parameter is a recognition grammar for a common speech, the media resource processing device performs the speech recognition according to the recognition grammar parameter.

The recognition grammar, which is a specific character string. is embedded into the recognition grammar parameter, and the media resource processing device extracts a text string and performs the speech recognition after receiving the recognition grammar parameter.

When the recognition grammar for the speech is prestored on the media resource processing device or an external server, the recognition grammar parameter is a file ID and storage location information of a recognition grammar file, and the media resource processing device reads and caches the recognition grammar file according to the storage location information and performs the speech recognition according to the recognition grammar file which is read.

The related parameter further includes:

a parameter used during the speech recognition, which includes a parameter adapted to instruct whether to recognize a common speech only, and the media resource processing device performs the speech recognition according to the related parameter; and/or a parameter adapted to indicate a time length of the speech recognition, and the media resource processing device determines the time length of the speech recognition according to the parameter; and/or a parameter adapted to indicate a waiting time, and the media resource processing device determines the waiting time for a user to input according to the parameter; and/or a parameter adapted to indicate a type of a language to be recognized, and the media resource processing device determines the type of the language employed during the common speech recognition according to the parameter; and/or a parameter adapted to indicate a recognition accuracy, and the media resource processing device determines the recognition accuracy required during the common speech recognition according to the parameter; and/or a parameter adapted to indicate a recognition sensitivity, and the media resource processing device determines the recognition sensitivity required during the common speech recognition according to the parameter; and/or a parameter adapted to indicate a storage location of a record, and the media resource processing device reads the record input by the user from a designated location according to the parameter; and/or a parameter adapted to indicate the grammar file to be read, and instruct to read the grammar file from an external server and cache the grammar file locally when the recognition grammar is stored in a file; and/or a parameter adapted to indicate a cache time for the grammar file and set the cache time for the grammar file read from the server, and if a duration of a cache exceeds the cache time which has been set, the cache is invalid.

During the speech recognition performed by the media resource processing device, the method includes:

detecting, by the media resource processing device, an abnormal event including the waiting time for a user to input timing out, a recognition timeout, a mismatch between a user input and grammar, the grammar file not existing, the grammar file being read error, a user input being unable to be recognized, a recognition error, and a software/hardware error of the media resource processing device; and/or detecting, by the media resource processing device, an event of inputting a speech by a user and reporting a speech type of a detected speech input by the user to the media resource control device, the speech including: a DTMF and a common speech.

The method further includes detecting, by the media resource processing device, the speech recognition process according to an instruction of the media resource control device, and feeding back a detection result to the media resource control device.

The method further includes feeding back, by the media resource processing device, a corresponding error code to the media resource control device when detecting the abnormal event during the speech recognition.

Various embodiments of the disclosure further provide a media resource processing device, including:

an instruction obtaining unit, adapted to obtain a related control parameter and a recognition grammar;

a speech obtaining unit, adapted to obtain a speech signal to be recognized which is input by a user and send the speech signal to a speech recognition unit;

the speech recognition unit, adapted to convert an input speech signal into a machine-recognizable character string according to the recognition grammar and the control parameter; and a sending unit, adapted to send a processing result of the speech recognition unit to a media resource control device.

The device further includes: a file obtaining unit, adapted to obtain a grammar file prestored externally and send the grammar file to the speech recognition unit, and the speech recognition unit extracts the recognition grammar from the grammar file received and processes a speech signal.

Various embodiments of the disclosure provides a system for implementing a speech recognition function, including:

a media resource control device, adapted to extend H.248 protocol, send an H.248 message carrying a speech recognition instruction and a related parameter to a media resource processing device, and control the media resource processing device to perform a speech recognition; and a media resource processing device, adapted to receive the H.248 message carrying the speech recognition instruction and the related parameter from the media resource control device, perform the speech recognition according to the parameter, and feed back a speech recognition result to the media resource control device.

The related parameter includes a speech recognition grammar parameter, and the media resource processing device extracts a text string and performs the speech recognition after receiving the recognition grammar parameter.

When a recognition grammar for a speech is prestored on the media resource processing device or an external server, the recognition grammar parameter is an ID and storage location information of a recognition grammar file, and the media resource processing device reads and caches the recognition grammar file according to the storage location information and performs the speech recognition according to the recognition grammar file which is read.

The media resource processing device includes:

a speech recognition unit, adapted to recognize a speech and convert a speech signal into a machine-recognizable character string; and the speech recognition unit is configured in the media resource processing device or configured independently.

In comparison with the prior art, according to various embodiments of the disclosure, a speech recognition instruction and a related parameter are carried in an H.248 message by defining an H.248 protocol extended package, so as to instruct a media resource processing device to perform a speech recognition corresponding to the parameter. The media resource processing device receives the H.248 message carrying the instruction and the parameter sent by the media resource control device, and performs the speech recognition according to the parameter. Therefore, the recognition for a common speech input by a user may be implemented via the H.248 protocol. Thus, the user may interact with a system directly via a speech, the user input mode may be simplified, and the input operation may be easier and simpler.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
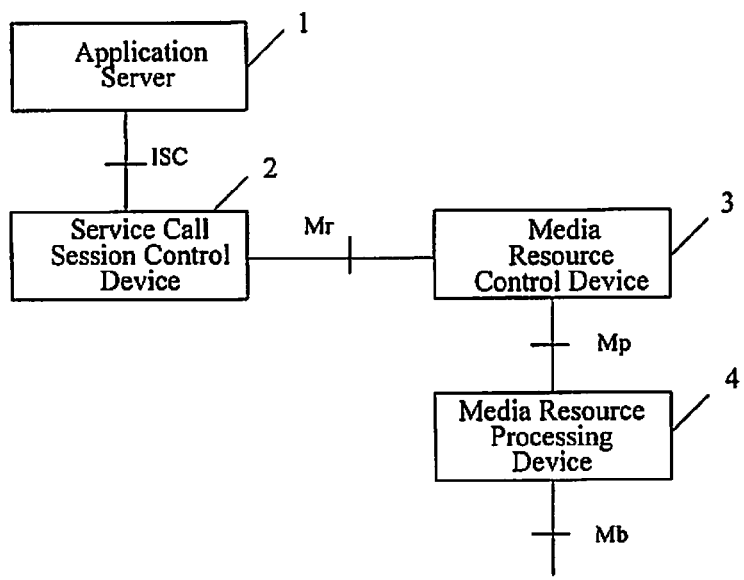
FIG. 1 is a schematic diagram showing the network architecture for processing a media resource service in a WCDMA IMS network of the prior art.

As shown in FIG. 1, in a WCDMA IMS network, application server 1 is adapted to process various services, such as playing an announcement to a user, DTMF digit collection, conference and recording. Service call session control device 2 is adapted to process a routing and forward a message sent by application server 1 to media resource control device 3 correctly, or route a message sent by media resource control device 3 to application server 1 correctly. Media resource control device 3 is adapted to control media resources, select a corresponding media resource processing device 4 and control the processing for media resources according to the requirement of application server 1. Media resource processing device 4 is adapted to process media resources, and complete the processing for the media resources issued by application server 1 under the control of media resource control device 3.

The interface employed among application server 1, service call session control device 2 and media resource control device 3 uses SIP protocol and XML protocol, or SIP protocol and a protocol similar to XML (for example, VXML). The interface employed between media resource control device 3 and media resource processing device 4 is an Mp interface and uses H.248 protocol. The external interface of media resource processing device 4 is an Mb interface using RTP protocol to carry a user media stream.

Figure 2:
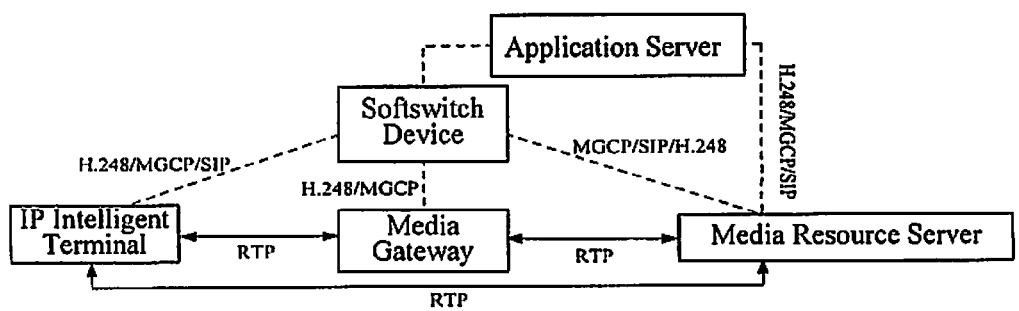
FIG. 2 is a schematic diagram showing the network architecture for processing a media resource service in a fixed soft switched network of the prior art.

FIG. 2 is a schematic diagram showing the network architecture for processing a media resource service in a fixed soft switched network. Media Resource Server (MRS) corresponds to media resource control device 3 and media resource processing device 4 in the WCDMA IMS network, and the application server corresponds to application server 1 and service call session control device 2 in the WCDMA IMS network, and the function of the softswitch device is substantially the same as that of application server 1.

The method for implementing the speech recognition function via H.248 protocol according to the disclosure is adapted to process media resources in the WCDMA IMS network shown in FIG. 1 and the fixed softswitch network shown in FIG. 2. Similarly, the method may also be applied to other networks, for example, CDMA network and fixed IMS network, and WCDMA and CDMA circuit softswitch network. In CDMA network and fixed IMS network, the architecture and service process flow of the media resource application scenario are basically the same as those of the WCDMA IMS network. In WCDMA and CDMA circuit softswitch network, the media resource application architecture and service process flow are basically the same as those of the fixed softswitch network. In other words, the disclosure may be applied to the case in which a media resource-related device is controlled via H.248 protocol to implement the speech recognition function.

The method for implementing the speech recognition function via H.248 protocol according to the disclosure will now be illustrated by taking the case in which the method is applied to WCDMA IMS network as an example, in conjunction with the drawings.

Usually, the speech recognition includes common speech recognition and DTMF recognition, and the common speech recognition and the DTMF recognition usually may occur at the same time. For the DTMF recognition and the common speech recognition, different technologies are used and the control process and parameters needed are also different. Because the detection of a DTMF has already been defined in H.248 protocol, the disclosure will emphasize in the common speech recognition and the simultaneous recognition of the common speech and the DTMF.

Herein, because the disclosure relates to the process between media resource control device 3 and media resource processing device 4 shown in FIG. 1 while other processes are the same as those in the existing WCDMA IMS network, for simplification, only the process between media resource control device 3 and media resource processing device 4 will be described.

Figure 3:
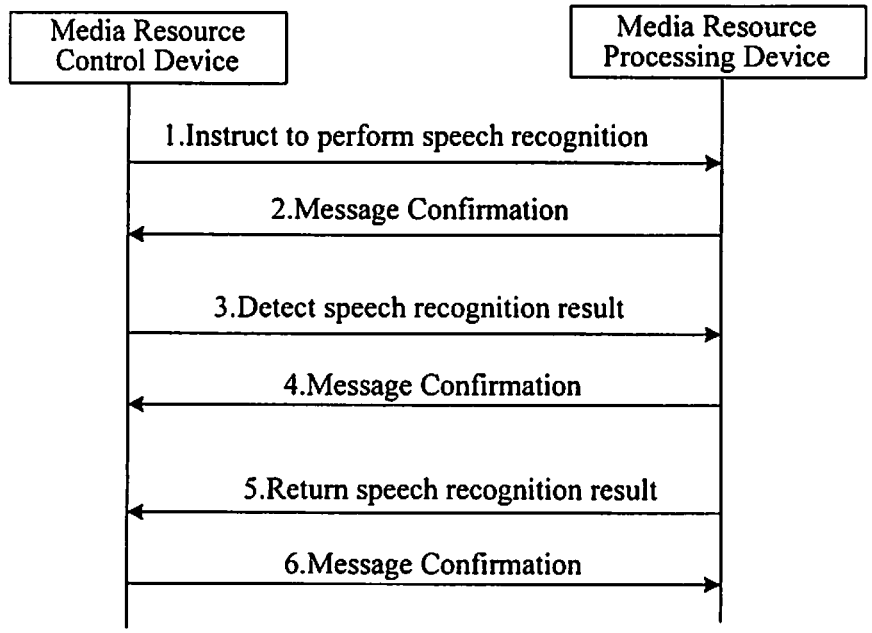
FIG. 3 is a flow chart of the method for implementing the speech recognition function according to various embodiments of the disclosure.

FIG. 3 is a flow chart of the process in which media resource control device 3 and media resource processing device 4 control and process media resources.

Step 1: Media resource control device 3 sends an instruction to perform a speech recognition to media resource processing device 4.

Specifically, media resource control device 3 carries a speech recognition instruction and related parameters in an H.248 message by defining an H.248 protocol extended package, so as to control a media resource processing device to perform the speech recognition. The H.248 protocol extended package is defined as follows:

| Package Name | ASR package |
|---|---|
| PackageID | asrp(0x??) |
| Description | Refer to the description of the solution |
| Version | 1 |
| Extends | Null |

1. Properties
Null
2. Events
Refer to the definition of an event below.
3. Signals
Refer to the definition of a signal below.
4. Statistics
Null
5. Procedure
The procedure corresponding to the whole solution described below.

Here, the speech recognition includes common speech recognition and a DTMF recognition. The recognition grammar of DTMF has been defined in H.248 protocol. The common speech recognition needs to carry a recognition grammar, and there are two methods for carrying the recognition grammar parameter.

The recognition grammar is carried in the parameter of an H.248 message.

The recognition grammar is a character string of a specific format, for example:
JSGF v1.0;
Grammar drink;
Public <returncommands>=water|soda|fruit juice|nothing The format of the text string is not recognized by a functional entity for processing H.248 protocol. The text string is only embedded in an H.248 message as a string. After receiving the parameter, media resource processing device 4 may directly extract the text string and submit the text string extracted to a speech recognizer for processing. The speech recognizer may be configured in media resource processing device 4 and may also be configured independently.

The ID and the storage location information of the speech recognition grammar are carried in the parameter of an H.248 message.

The speech recognition grammar may be prestored on media resource processing device 4 or other external servers, and the ID and the storage location information of the grammar file are carried in the H.248 message.

The ID of the file may be any text string which conforms to the file naming specification.

The storage location information of the file includes the following three forms.

a file which can be locally accessed directly, such as drink.gra.

a file which can be accessed in file:// mode, such as file://huawei/drink.gra.

a file which can be accessed in http:// mode, such as http://huawei/drink.gra.

After receiving the parameter, media resource processing device 4 first reads the grammar file from a remote server or a local storage according to the storage location of the file, puts the grammar file into a cache, and then processes the grammar file via a speech recognizer.

In addition to the recognition grammar or related information, parameters for performing the speech recognition also need to be carried in the H.248 message. The parameters for performing the speech recognition are adapted to instruct media resource processing device 4 to perform the speech recognition function. The parameters include the following parameters.

Whether to recognize a DTMF and a common speech simultaneously

In certain applications, the user is only required to input a common speech. If this parameter is set as Yes, media resource processing device 4 will perform the common speech recognition and the DTMF recognition no matter the user inputs a common speech or a DTMF.

Recognition Duration

This parameter is adapted to indicate the length of the recognition time. In other words, when a user starts to input, if the speech recognition is not completed in a specified duration, the process returns for time out.

Waiting Time for a User to Input

This parameter is adapted to indicate the waiting time of the recognition. In other words, when the recognition is started, if no user input is detected in a given duration, the process returns for time out.

Type of Language to be Recognized

This parameter is adapted to indicate the type of the language employed by the media resource processing device during the common speech recognition, and this parameter conforms to, for example, the definition of RFC3066 protocol.

Recognition Accuracy

This parameter represents the recognition accuracy, as indicated by a value between 0 and 100. The higher the accuracy is, the more the processing amount will be, and the longer the recognition time will be.

Sensitivity

This parameter is adapted to represent the sensitivity needed by the speech recognition, as indicated by a value between 0 and 100. The higher the sensitivity is, the more the influence from the background noise will be; and the lower the sensitivity is, the less the influence from the background noise will be.

Record Storage Location

During the speech recognition, the user input may be recorded and stored in a designated location. This parameter is adapted to indicate the storage location of the user record.

Whether to Prefetch a Grammar File

When the recognition grammar is stored in the mode of file, if this parameter is set as Yes, media resource processing device 4 reads the grammar file from an external server and caches the grammar file locally after receiving a request; if this parameter is set as No, the grammar file is read during the recognition.

Cache Time of the Grammar File

This parameter represents the length of time during which media resource processing device 4 caches a grammar file read from a server. If time runs out, the cache is regarded as invalid.

The H.248 protocol package mentioned in the Step 1 uses the following definitions.

Signal: The Signal includes Automatic Speech Recognition (ASR) Grammar File signal or ASR Grammar String signal, corresponding to the two methods for carrying a recognition grammar parameter respectively.

The ASR Grammar File is adapted to instruct to perform the speech recognition function.

| Signal Name | ASR Grammar File |
|---|---|
| SignalID | asrgf(0x??) |
| Description | Perform ASR function |
| SignalType | br |
| Duration | Not Applicable |

Additional Parameter includes:

| I. | |
|---|---|
| Parameter Name | Grammar File |
| ParameterID | gf(0x??) |
| Description | ASR recognition grammar file name and storage location |
| Type | Character String (String) |
| Optional | No |
| Possible Value | Valid file ID and storage format |
| Default | Null |

| II. | |
|---|---|
| Parameter Name | Recognize DTMF |
| Parameter ID | rd(0x??) |
| Description | Whether to recognize DTMF simultaneously |
| Type | enum |
| Optional | Yes |
| Possible Value | Yes, No |
| Default | Yes |

| III. | |
|---|---|
| Parameter Name | Wait Recognize Time |
| ParameterID | wrt(0x??) |
| Description | waiting time for recognition |
| Type | Integer |
| Optional | Yes |
| Possible Value | Larger than 0 second |
| Default | Null |

IV.

| | |
|---|---|
| Parameter Name | Wait Input Time |
| ParameterID | wit(0x??) |
| Description | waiting time for a user to input |
| Type | Integer |
| Optional | Yes |
| Possible Value | Larger than 0 second |
| Default | Null |

V.

| | |
|---|---|
| Parameter Name | Language Type |
| ParameterID | lt(0x??) |
| Description | Type of language to be recognized |
| Type | Character String |
| Optional | Yes |
| Possible Value | Conform to RFC3066 protocol |
| Default | Null |

VI.

| | |
|---|---|
| Parameter Name | Recognize Accuracy |
| ParameterID | ra(0x??) |
| Description | Accuracy of recognition |
| Type | Integer |
| Optional | Yes |
| Possible Value | 0~100 |
| Default | Null |

VII.

| | |
|---|---|
| Parameter Name | Recognize Sensitivity |
| ParameterID | ra(0x??) |
| Description | Requirement for recognition sensitivity |
| Type | Integer |
| Optional | Yes |
| Possible Value | 0~100 |
| Default | Null |

VIII.

| | |
|---|---|
| Parameter Name | Record File |
| ParameterID | rf(0x??) |
| Description | Record storage location of the speech to be recognized |
| Type | Character String |
| Optional | Yes |
| Possible Value | Valid URI string or local file name |
| Default | Null |

IX.

| | |
|---|---|
| Parameter Name | Prefetch Grammar |
| ParameterID | pg(0x??) |
| Description | Whether to prefetch a grammar file |
| Type | enum |
| Optional | Yes |
| Possible Value | Yes, No |
| Default | Null |

X.

| | |
|---|---|
| Parameter Name | Cache Time |
| ParameterID | ct(0x??) |
| Description | Cache time of the grammar file |
| Type | Integer |
| Optional | Yes |
| Possible Value | Larger than 0 second |
| Default | Null |

2) ASR Grammar String is adapted to instruct to perform the speech recognition function.

| | |
|---|---|
| Signal Name | ASR Grammar String |
| SignalID: | ags(0x??) |
| Description | Perform ASR function according to grammar string |
| Signal Type | br |
| Duration | Not Applicable |

Additional Parameter includes:

I.

| | |
|---|---|
| Parameter Name | Grammar String |
| Parameter ID | gf(0x??) |
| Description | ASR recognition grammar |
| Type | Character String |
| Optional | No |
| Possible Value | Valid recognition grammar |
| Default | Null |

II. Other parameters are the same as II, III, IV, V, VI, VII and VII of ASR Grammar File signal.

Step 2: When media resource processing device 4 receives the speech recognition instruction from media resource control device 3, media resource processing device 4 performs a message confirmation and feeds back the confirmation result to media resource control device 3. Moreover, media resource processing device 4 performs the corresponding process according to the above parameters in the message, such as, whether to recognize a DTMF and a common speech simultaneously, recognition duration, waiting time for a user to input, record storage location, whether to prefetch a grammar file, cache time of the grammar file. Specifically, a speech recognizer recognizes a speech input by a user, including the type of language, accuracy and sensitivity of the recognition.

Step 3: Media resource control device 3 instructs media resource processing device 4 to detect an event which occurs during the speech recognition.

Step 4: Media resource processing device 4 performs a message confirmation and feeds back the confirmation result to media resource control device 3. Moreover, media resource processing device 4 detects the event which occurs during the speech recognition.

The possible event includes the following.

An error code for performing the speech recognition function is returned in an abnormal situation.

When media resource processing device 4 performs the speech recognition, if an abnormality occurs, a specific error code needs to be returned to the media resource control device. The specific value of the error code is defined and allocated uniformly according to the related standard, and the content of the error code includes:

the waiting time for a user to input the speech exceeds a predetermined time;

the speech recognition time exceeds a predetermined time;

the speech input by the user mismatches the recognition grammar;

the grammar file does not exist;

grammar file read error;

speech recognition grammar error;

unable to be recognized or recognition error;

a hardware error of media resource processing device 4;

a software error of media resource processing device 4; and other errors.

It is detected that a user starts to input a speech.

When a user starts to input a speech, media resource processing device 4 may report the type of the detected speech input by the user to media resource control device 3. The input speech includes the DTMF and the common speech.

In Step 4, the events defined via H.248 protocol package includes the following.

Events:

1) ASR Failure

| | |
|---|---|
| Event Name | ASR Failure |
| Event ID | asrfail(0x??) |
| Description | Speech recognition is failed, and an error code is returned |
| EventDescriptor Parameters | Null |

ObservedEventDescriptor Parameters:

I.

| | |
|---|---|
| Parameter Name | Return Failure Code |
| ParameterID | rfc(0x??) |
| Description | Error code parameter |
| Parameter Type | Integer |
| Optional | No |
| Possible Value | Error code defined in the above solution |
| Default | Null |

2) ASR Success

| | |
|---|---|
| Event Name | ASR Success |
| EventID | asrsucc(0x??) |
| Description | Speech recognition is successful, and the recognition result is returned |
| EventDescriptor Parameters | Null |

ObservedEventDescriptor Parameters:

I.

| | |
|---|---|
| Parameter Name | ASR Result |
| ParameterID | ar(0x??) |
| Description | Recognition Result |
| Parameter Type | Character String |
| Optional | No |
| Possible Value | DTMF string or text string |
| Default | Null |

II.

| | |
|---|---|
| Parameter Name | Result Reliability |
| ParameterID | rr(0x??) |
| Description | Reliability of the recognition result |
| Parameter Type | Integer |
| Optional | Yes |
| Possible Value | 0~100 |
| Default | 100 |

3) ASR Begin

| | |
|---|---|
| Event Name | ASR Begin |
| EventID | asrbeg(0x??) |
| Description | Speech recognition is successful, and the recognition result is returned |
| EventDescriptor Parameters | Null |

ObservedEventDescriptor Parameters:

I.

| | |
|---|---|
| Parameter Name | Input Type |
| ParameterID | it(0x??) |
| Description | Type of User input: DTMF and common speech |
| Parameter Type | Character String |
| Optional | No |
| Possible Value | DTMF and common speech |
| Default | Null |

Step 5: After media resource processing device 4 completes the speech recognition according to the parameters carried by media resource control device 3, media resource processing device 4 reports the event detected during the speech recognition, and reports the returned recognition result reliability to media resource control device 3.

The recognition result is a character string, and the character string may be the recognition result of a DTMF string or the recognition result of the common speech. The functional entity for processing H.248 protocol cannot recognize the string and then returns the string to media resource control device 3 for processing.

Step 6: Media resource control device 3 confirms the recognition result reported by media resource processing device 4.

Figure 4:
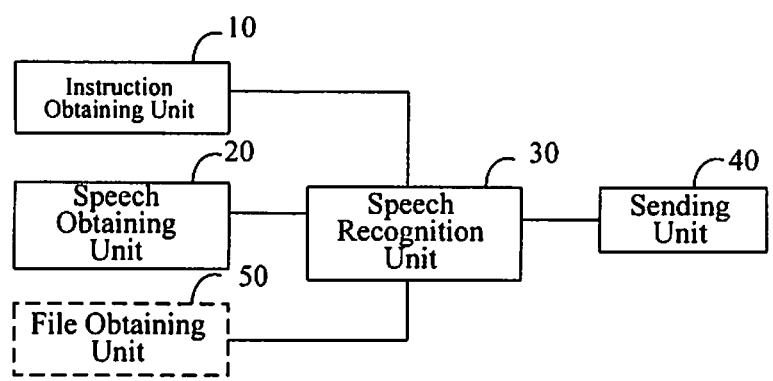
FIG. 4 is a schematic diagram showing the structure of the device for implementing the speech recognition function according to various embodiments of the disclosure.

With reference to FIG. 4, various embodiments of the disclosure provide a media resource processing device, including:

instruction obtaining unit 10, adapted to obtain a related control parameter and a recognition grammar;

speech obtaining unit 20, adapted to obtain a speech signal to be recognized which is input by a user and send the speech signal to a speech recognition unit;

speech recognition unit 30, adapted to convert an input speech signal into a machine-recognizable character string according to the recognition grammar and the control parameter; and sending unit 40, adapted to send a processing result of the speech recognition unit to a media resource control device.

The device further includes file obtaining unit 50 adapted to obtain a grammar file prestored externally and send the grammar file to the speech recognition unit when the recognition grammar is provided via an external file, and the speech recognition unit extracts the recognition grammar from the grammar file received and processes a speech signal.

various embodiments of the disclosure provide a system for implementing a speech recognition function, including:

a media resource control device, adapted to extend H.248 protocol, send an H.248 message carrying a speech recognition instruction and a related parameter to a media resource processing device, and control the media resource processing device to perform the speech recognition; and a media resource processing device, adapted to receive the H.248 message carrying the speech recognition instruction and related parameter from the media resource control device, perform the speech recognition according to the parameter, and feed back a speech recognition result to the media resource control device.

The related parameter includes a speech recognition grammar parameter, and the media resource processing device extracts a text string and performs the speech recognition after receiving the recognition grammar parameter.

When a recognition grammar for a speech is prestored on the media resource processing device or an external server, the recognition grammar parameter is an ID and storage location information of a recognition grammar file, and the media resource processing device reads and caches the grammar file according to the storage location information and performs the speech recognition according to the grammar file which is read.

The media resource processing device includes:

a speech recognition unit, adapted to recognize a speech and convert a speech signal into a machine-recognizable character string.

The speech recognition unit is configured in the media resource processing device or configured independently By various embodiments of the disclosure, a speech recognition-related service application may be provided to a user in a media resource application of fixed or mobile network. For example, by replacing the key input with the speech input, a user may accomplish basic functions such as calling and querying via a speech.

Additional advantages and modifications will readily occur to those skilled in the art. Therefore, the disclosure in its broader aspects is not limited to the specific details and representative embodiments shown and described herein. Accordingly, various modifications and variations may be made without departing from the scope of the disclosure as defined by the appended claims and their equivalents.

What is claimed is:

1. A method for recognizing a speech, comprising:
receiving, by a media resource processing device, an H.248 message carrying a speech recognition instruction and a related parameter sent by a media resource control device, wherein the related parameter comprises a recognition grammar parameter for the speech, the recognition grammar parameter for the speech is a recognition grammar for a common speech;

performing, by the media resource processing device, speech recognition according to the speech recognition instruction and the related parameter; and reporting a recognition result to the media resource control device, the method further comprise:

extracting, by the media resource processing device, a text string and performing the speech recognition after receiving the recognition grammar parameter, wherein a specific character string is embedded into the recognition grammar parameter.

2. The method according to claim 1, wherein when the recognition grammar for the speech is prestored on the media resource processing device or an external server, the recognition grammar parameter is an ID and storage location information of a recognition grammar file, and the media resource processing device reads and caches the recognition grammar file according to the storage location information and performs the speech recognition according to the recognition grammar file which is read.

3. The method according to claim 1, during the speech recognition performed by the media resource processing device, further comprising at least one of:

detecting, by the media resource processing device, an abnormal event comprising the waiting time for a user to input timing out, a recognition timeout, a mismatch between a user input and grammar, the grammar file not existing, the grammar file being read error, a user input being unable to be recognized, a recognition error, and a software/hardware error of the media resource processing device; and detecting, by the media resource processing device, an event of inputting a voice input by a user and reporting a type of a detected voice input by the user to the media resource control device, the voice input comprising: a dual tone multi-frequency (DTMF) and a common speech.

4. The method according to claim 3, further comprising detecting, by the media resource processing device, a speech recognition process according to an instruction of the media resource control device, and feeding back a detection result to the media resource control device.

5. The method according to claim 4, further comprising feeding back, by the media resource processing device, a corresponding error code to the media resource control device when detecting the abnormal event during the speech recognition.

6. The method according to claim 1, wherein the specific character includes one or more grammar rules of speech recognition, the method further comprising:

extracting, by the media resource processing device, the one or more grammar rules after receiving the specific character; and performing the speech recognition according to the one or more grammar rules.

7. The method according to claim 6, wherein at least one of the grammar rules define permissible results of the speech recognition.

* * * * *